United States Patent [19]

Hasegawa

[11] Patent Number: 4,707,853
[45] Date of Patent: Nov. 17, 1987

[54] ELECTRONIC PRIVATE BRANCH EXCHANGES

[75] Inventor: Iwao Hasegawa, Hino, Japan

[73] Assignee: Kabushiki Kaisha Toshiba, Kawasaki, Japan

[21] Appl. No.: 749,674

[22] Filed: Jun. 28, 1985

[30] Foreign Application Priority Data

Jun. 28, 1984 [JP] Japan ............................... 59-133523
Apr. 30, 1985 [JP] Japan ................................. 60-92991

[51] Int. Cl.⁴ ...................... H04M 3/42; H04M 15/34
[52] U.S. Cl. ..................................... 379/221; 379/128
[58] Field of Search .............. 179/7.1 TP, 7.1 R, 8 A, 179/9, 10, 7 R, 7 MM, 18 D, 18 EA, 27 D, 18 AD; 379/220, 221, 234, 231, 112, 113, 128

[56] References Cited

U.S. PATENT DOCUMENTS 3,231,676  1/1966  Carlström et al. ............. 179/18 EA
3,297,829 10/1963  Germanton ....................... 179/27 D
3,504,129  3/1970  Ewin et al. ........................ 179/7 R
3,588,369  6/1971  Lee et al. ......................... 179/18 D
4,410,765 10/1983  Hestad et al. ................... 179/18 EA
4,577,066  3/1986  Bimonte et al. ................ 179/18 EA Primary Examiner—James L. Dwyer
Attorney, Agent, or Firm—Finnegan, Henderson, Farabow, Garrett & Dunner

[57] ABSTRACT

An electronic private branch exchange apparatus is constituted by a plurality of office line trunk circuits for connecting a calling terminal in an exchange network to one of a plurality of office lines. An order of connection priority for the office line trunk circuits is set and a range of the office line trunk circuits is set, with a range of the office line trunk circuits selected according to the order of connection priority in accordance with a time band within which a call is made. Ofice line trunk circuits are selected according to the order of connection priority in a designated range.

25 Claims, 14 Drawing Figures

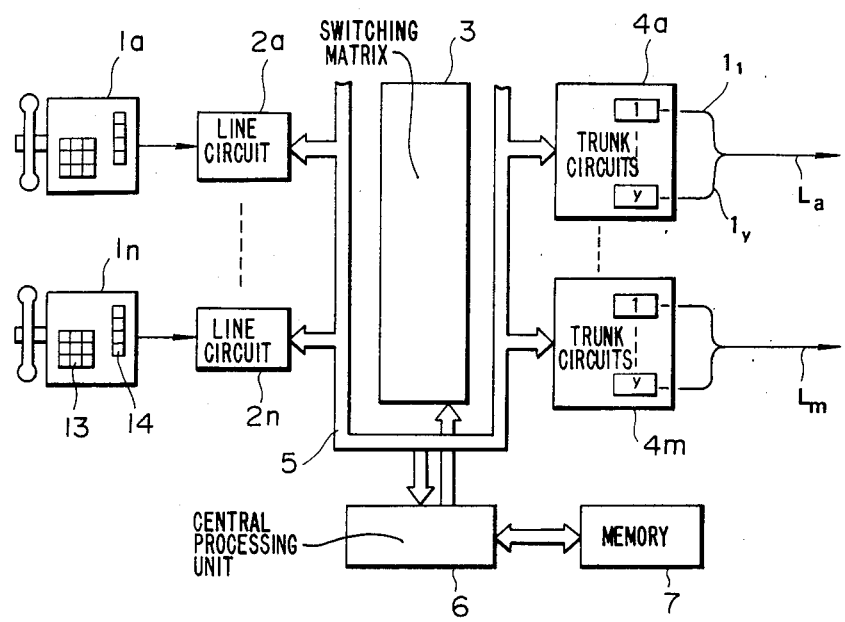

FIG.5(a)

| | TG₁ | TG₂ | --- | | TGⱼ |
|---|---|---|---|---|---|
| TR₁ | | | | | |
| ⋮ | ⋮ | ⋮ | | | |
| TRᵢ | TG₁ | TG₂ | TG₅ | TGᵢ | --- |
| ⋮ | | | | | |
| TRℓ | | | --- | | FF |

| | |
|---|---|
| TG₁ | 1 |
| TG₂ | 1 |
| ⋮ | |
| TG₅ | 1 |
| ⋮ | |
| TGℓ | 00 |

| | | | |
|---|---|---|---|
| TR₁ | FF | FF | --- |
| TR₂ | FF | FF | --- |
| ⋮ | ⋮ | ⋮ | |
| TRᵢ | DN6Kla | FF | --- |
| ⋮ | | | |
| TRℓ | FF | FF | --- |

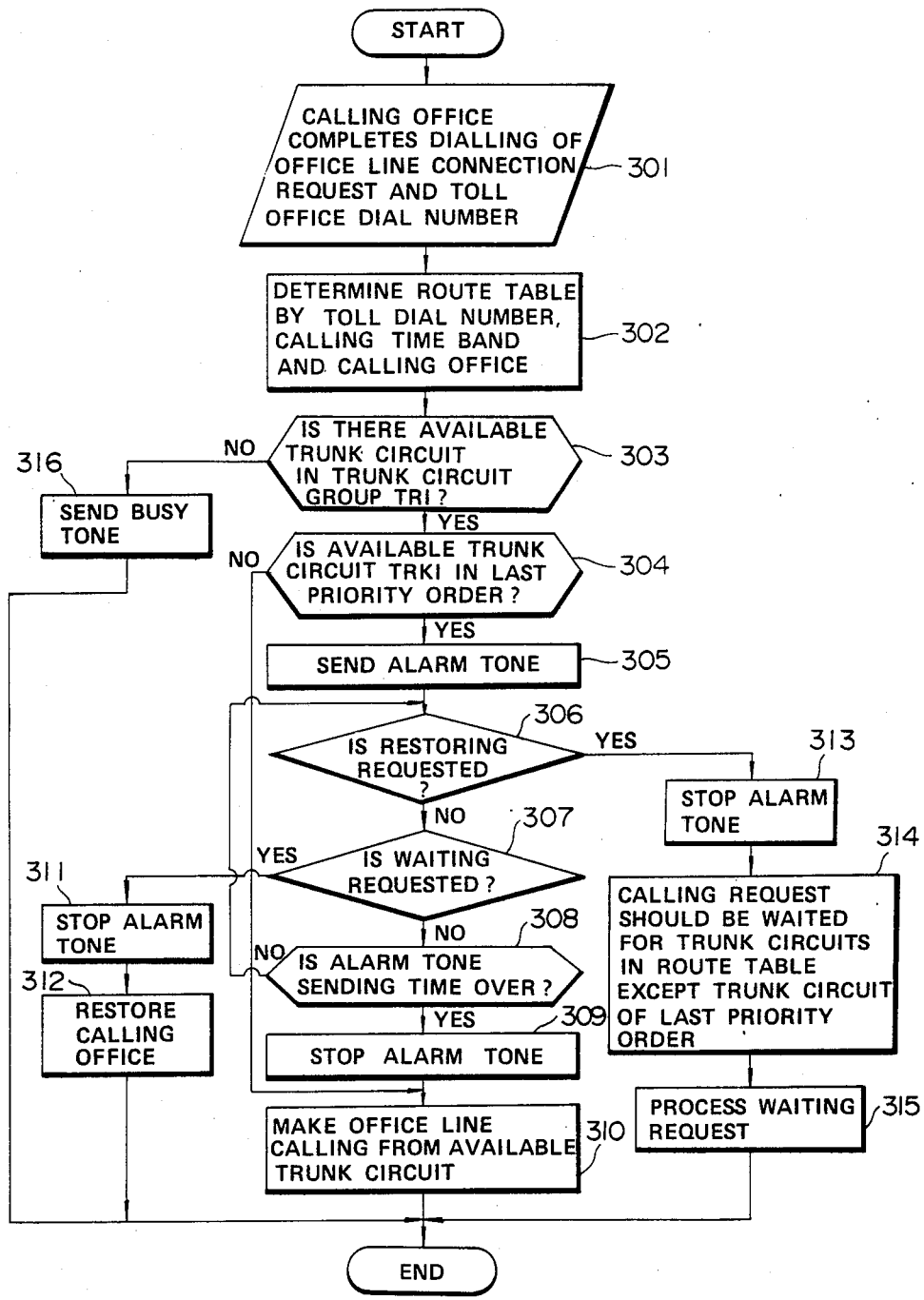

ELECTRONIC PRIVATE BRANCH EXCHANGES

BACKGROUND OF THE INVENTION

1. Field of the Invention

This invention relates to an electronic private branch exchange (PBX) in which a calling rate can be economically selected at the time of placing a call over an office line, that is, a line connecting the PBX to an outside switching network.

In a prior art electronic private branch exchange connected to a public telephone line and an exclusive line, office line trunk circuits (hereinafter merely called trunk circuits) which connect the telephone exchange to the PBX are classified into a plurality of groups in accordance with the difference in the signal type of the circuits, rate system, and dial numbering system. The order of priority for connecting callers to the trunk circuits in the PBX network is set for the trunk circuits by respective groups, and a trunk circuit connectable to the office line is detected in accordance with the order of priority for connecting the lines. In such a PBX, a calling rate can be economically selected by setting the order of connection according to the amount of rate to be paid.

A Bell telephone exchange network developed in the United States of America has been well known as this type of PBX. According to this network, there are provided exchange line networks of different rate classes which are termed "trunk lines" to be charged at different rates, which includes full business day (FBD) and wide area telephone system (WATS) networks in which the telephone can be used in a wide area at a single rate system, a message toll (MT) WATS network utilizing different rate systems, and a direct line distance dial (DDD) network utilizing another rate system. Consequently, the overall calling charges reduced when the trunk circuit connected to the office line is selected from the lowest rates available.

In the Bell telephone network, when a call from an office line is attempted, an idle trunk circuit in a FBD network which is the lowest rate is detected by sequential scanning, whereas when there is no idle trunk circuit in the FBD network, the scanning is continued until an idle trunk circuit is detected in the MT network.

Other types of idle trunk circuit scanning systems which are known include a waitless trunk limitation system, a trunk limitation waiting system and a definite time waiting system. In all of these systems, an idle trunk circuit is sequentially detected according to the lowest available rate.

In the above described idle trunk scanning systems, however, all trunks circuits, in priority, are checked for availability. Therefore, where large numbers of calls are being placed, it takes a long time until an available idle trunk circuit is detected, whereby a calling party waits a long time. Otherwise, the calling party would be connected to a trunk circuit of a high rate against his will. Furthermore, a control device for detecting an idle trunk circuit must continue the sequential scanning of respective trunk circuits until an idle trunk circuit is detected, which increases the burden of the control device and further increases the waiting time of the calling party.

SUMMARY OF THE INVENTION

Accordingly, it is an object of this invention to provide a novel control system of an electronic private branch exchange capable of reducing the selected calling rate, thus economically providing telephone service.

Another object of this invention is to provide a novel electronic private branch exchange capable of decreasing the burden of a control device for detecting an idle trunk circuit, shortening the waiting time, and decreasing the rate, thereby economically utilizing selective calling rates and increasing the efficiency of the telephone exchange processing.

According to this invention, there is provided electronic private branch exchange apparatus comprising a plurality of office line trunk circuits for connecting a calling terminal in an exchange network to one of a plurality of office lines, setting means for setting a order of connection priority for the plurality of office line trunk circuits, designating means for designating a range of the office line trunk circuits selected according to the order of connection priority in accordance with a time band within which a calling is made, and selecting means for selecting one of the office line trunk circuit among the plurality of office line trunk circuits according to the order of connection priority in a range determined by the designating means.

According to a modification of this invention, there is provided electronic private branch exchange apparatus comprising a plurality of office line trunk circuits for connecting a calling terminal in an exchange network and a plurality of office lines, setting means for setting an order of connection priority for the plurality of office line trunk circuits, designting means for designating a range of the office line trunk circuits selected according to the order of connection priority in accordance with a time band within which a calling is made, selecting means for selecting one office line trunk circuit according to the order of connection priority in a range designated by the designating means, and alarm means for issuing an alarm when an office line trunk circuit of the last order of priority is selected by the selecting means.

According to another modification, there is provided an electronic private branch exchange apparatus comprising a plurality of office line time trunk circuits for connecting a calling terminal in an exchange network to one of a plurality of office lines, setting means for setting an order of connection priority for the office line trunk circuits, designating means for designating a range of the office line trunk circuits selected according to the order of connection priority in accordance with a time band within which a calling is made, selecting means for selecting one of the office line trunk circuits in accordance with the order of connection priority in a range designated by the designating means, alarm means for issuing an alarm when an office line trunk circuit of the last order of priority is selected by the selecting means, and waiting means for rendering a calling request from the calling terminal to become a waiting state for office line trunk circuits except an office line trunk circuit of the last order of priority when a predetermined operation is made while the alarm is being issued from the alarm means.

BRIEF DESCRIPTION OF THE DRAWINGS

In the accompanying drawings:

FIG. 1 is a block diagram showing one embodiment of this invention;

FIG. 5a through 5c show memory blocks of a memory device utilized in the modification shown in FIG. 4 and the contents of the memory blocks;

FIG. 6 is a flow chart showing a trunk line selection processing when an office line calling call is requested;

DESCRIPTION OF THE PREFERRED EMBODIMENT

Figure 2C:
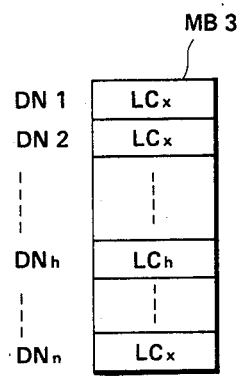
FIG. 2a through 2d show memory blocks of a memory device shown in FIG. 1 and the contents of the memory blocks.
Figure 2D:
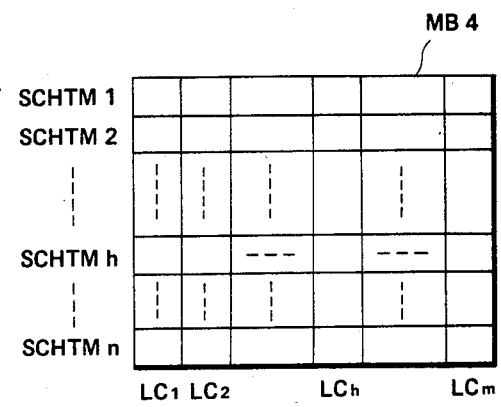
Figure 2E:
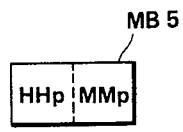

In a preferred embodiment of this invention, n (an integer) electronic key telephone sets (calling terminals) $1a-1n$ (hereinafter merely termed as key telephone sets) are installed in an exchange network, and the key telephone sets are connected to a switching matrix (SW) 3 respectively through line circuits (LC) $2a-2n$.

The switching matrix 3 is connected to m (an integer) office line groups La-Lm which are classified, for example, according to the rate system respectively through m trunk circuit groups (TRK) $4a-4m$. In this case, the m office line groups La-Lm are constituted by y (a positive integer) office lines $l_1-l_y$ and the trunk circuit groups $4a-4m$ are respectively constituted by y trunk circuits $TRK_1-TRK_y$ corresponding to y office lines $l_1-l_y$.

These switching matrix 3 and the trunk circuit groups $4n-4m$ are connected to a central processing unit (CC) 6 via a control data bus line 5 so that according to control data prestored in a memory circuit (MEM) 7, the talking paths between the office line groups La-Lm and the key telephone sets $1a-1n$ and the talking paths between key telephone sets $1a-1n$ are established.

In addition to the capability of storing control informations for establishing the talking paths, the memory circuit 7 is provided with memory blocks MB1-MB5 as shown in FIGS. 2a-2e for increasing the efficiency of the exchange processing performance and for economically utilize calling rates. The first memory block MB1 stores trunk circuit group numbers $TG_1-TG_j$ ($j \leq m$) according to the order of priority, the trunk circuit group numbers being selectable according to m toll dial number formats $KKD_1-KKD_m$ respectively.

The second memory block MB2 stores data $HH_1:MM_1-HH_i:MM_i$ for the "hour" and "minute" at the starting time. When 24 hours (one day) is divided into a plurality of time bands $SCHTM_1-SCHTM_i$, while the third memory block MB3 stores selection range data LCx (x=1-m) for discrete calling terminals that designate the ranges of the trunk circuit group selectable by the key telephone sets $DN_1-DN_m$ capable of calling.

The fourth memory block MB4 stores a selection range l ($l \leq j$) that designates the range of the trunk circuits selectable in accordance with a combination of calling terminal selection range data LCx and time bands $SCHTM_1-SCHTM_j$ while the fifth memory block MB5 stores present time data HHP : MMP regarding present "hour" and "minute", the content of this memory block being successively updated by the control processing unit 6.

Each of the key telephone sets $1a-1n$ is usually provided with a handset 11, a hook switch 12, a dial mechanism 13 and various service keys 14. To place a call from a key telephone set over an office line, that is, to a destination outside the PBX, handset 11 is raised and a desired office line calling request number is dialed, followed by toll office line dial number.

The processing of a call from a key telephone set 1a which is authorized to place calls outside the PBX will be described with reference to the flow chart shown in FIG. 3.

Assume now that the key telephone set 1a is to make a call. The calling in formation is transferred to the central processing unit 6 via line circuit 2a. When the switching matrix 3 is in a condition that permits line connection for the calling information from the key telehone set 1a, the central control unit 6 sends a dial tone to the key telephone set 1a to inform it that a dial tone operation of the private branch line as a toll office number is possible. Consequently, when numbers are dialed through the key telephone set 1i a, the central processing unit 6 judges whether line circuits LC or between a line circuit LC and an office line $l_1-l_y$.

When the result of the judgment shows that an office line connection is required, the central processing unit 6 agains sends the dial tone to the key telephone set 1a to inform it that a dial-in operation of the dial number information for the toll office following the toll office number is possible. After that, when supplied with the dial number information for the toll office from the key telephone set 1a via line circuit 2a, as shown by step 21 shown in FIG. 3, the central processing unit 6 decodes the format of the toll office dial numbers, and then reads out selectable trunk circuit group numbers $TG_1-TG_j$ from the memory block MB1 corresponding to the toll office dial number format, based on the result of decoding. At this time, when the type of the toll office dial number format is $KKD_h$ among the types $KKD_1-KKD_m$, at step 22, the trunk circuit group numbers $TG_1-TG_j$ selectable with the type $KKD_h$ of the toll office dial number mode are read out from the memory block MB1. Thereafter the central processing unit 6 reads out the present time HHp:MMp from the memory block MB5 and then at step 22, based on the present time HHp:MMp, judges whether the present time band corresponds to any one of the predetermined time bands $SCHTM_1-SCHTM_i$ according to the content of the memory block MG2 (step 22).

Then the central processing unit 6 reads out from the memory block MB3 the calling office selection range data LCx that designate the range of the trunk circuit groups selectable by the key telephone unit 1a. Assume now that the present time band is $SCHTM_h$ and that the selection range data is $LC_h$, the central processing unit 6 reads out from the memory block MB4, the selection range of the trunk circuit groups corresponding to the combination of the data $SCHTM_h$ and $LC_h$ at step 25.

Then the central processing unit 6 selects a calling trunk circuit group based on the trunk circuit group numbers $TG_1-TG_j$ selectable in accordance with the type of the toll office dial number format previously read out from the memory block MB1 and the selection range of the trunk circuit group thus obtained and corresponding to the key telephone unit 1a.

The selection of the calling trunk circuit group is completed by sequentially scanning the trunk circuit groups in the range shown by the selection range starting from the trunk circuit group $TG_1$ of the higher order of priority.

More particularly, at step 26, the central processing unit 6 sets a count '1' in a trunk circuit group scanning counter, and checks whether there is an idle trunk circuit or not in the trunk circuit group $TG_1$ of the highest order of priority. When there is an idle trunk circuit, the central processing unit 6 connects the idle trunk circuit to the key telephone unit 1a, and for connecting the calling office at this time for sending out the toll office dial number corresponding to the trunk circuit group $TG_1$ to the idle trunk circuit, thus completing the selection of the trunk circuit and the processing of the office line calling.

Where there is no idle trunk circuit in the trunk circuit group $TG_1$, however, the central processing unit 6 checks whether there is an idle trunk circuit or not in the trunk circuit group $TG_2$ registered as the second order of priority. When there is an idle trunk circuit, the central processing unit 6 connects the idle trunk circuit to the key telephone unit 1a in the same manner as has been described above, thus completing the selection of the trunk circuit and the processing of the office line calling.

The central processing unit 6 continues this selection processing of the trunk circuits until the trunk circuit group in a range shown by the selection range is selected. For example, where selection range l=3 and the order of the trunk circuit group numbers selectable corresponding to the toll office dial number modes are shown by $TG_1$, $TG_3$, $TG_5$, $TG_6$ and $TG_7$ in the order of priority, the central processing unit 6 checks whether there is an idle trunk in three trunk circuit groups $TG_1$, $TG_3$ and $TG_5$ in the order just mentioned. Where l=5, the central processing unit 6 checks whether there is an idle trunk circuit in five trunk circuit groups $TG_1$, $TG_3$, $TG_5$, $TG_6$ and $TG_7$ according to the order of priority.

When the result of check as to whether there is an idle trunk circuits in all trunk circuit groups in the range shown by the selection range data shows that there is an idle trunk circuit in either one of the trunk circuit groups, at the time of such detection, the idle trunk circuit is connected to the key telephone set 1a, that is the calling office, thus completing the selection of the trunk circuit and the processing of the office line calling.

Where there is no idle trunk circuit in the trunk circuit groups in a selection range 1, the central processing unit 6 sends a busy tone to the key telephone set 1a and then completes its selection processing of the trunk circuits.

Figure 3:
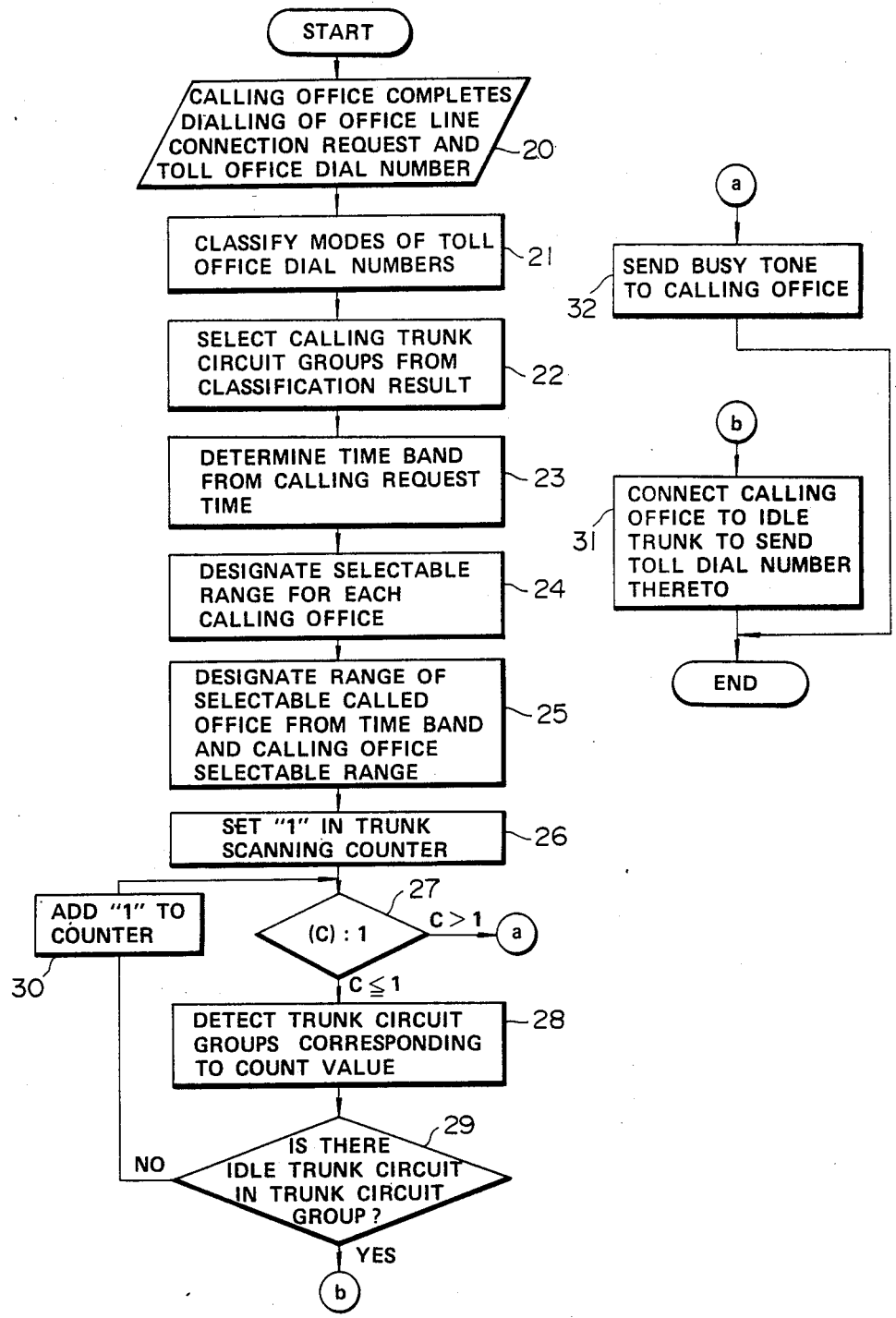
FIG. 3 is a flow chart showing a trunk circuit selection processing when an office line calling call is requested.

The process of detecting an idle trunk circuit is executed at steps 27–30 shown in FIG. 3, while the process of office line calling is executed at step 31. The sending of the busy tone is made at step 32.

As shown described, this embodiment is constructed such that the trunk circuit groups selectable according to the type of the toll office dial number modes are registered according to their orders of priority, and that the range of the trunk circuit groups selected according to the order of priority is changed in accordance with a combination of a calling office and a calling time band. As a consequence, for a time band in which a calling concentrates by narrowing the range of the trunk circuit groups selected according to this orders of priority, the busy tone can be immediately sent. Thus decreasing the waiting time of the calling party. It is also possible to connect the calling party to an office line of high rate contrary to the desire of the calling party. At the same time, the burden of the central processing unit 6 effecting the office line selection processing can be reduced.

Regarding a specific calling office, by narrowing or expanding the range of the selectable trunk circuit groups to an extreme degree, the telephone system can be made quite impossible to be used or the telephone set can be connected to any one of the office line by ignoring the rate. As a consequence, the efficiency of the exchange processing performance can be improved and the rate talking can be made economically.

Although in this embodiment, the key telephone set is used as the calling office, the invention is also applicable to any machine and apparatus so long as it utilizes a talking line.

Further, although the trunk circuits are divided into groups corresponding to y office lines per group, when the office lines are not divided into groups, the trunk circuits are not necessarily be divided into groups.

Figure 4:
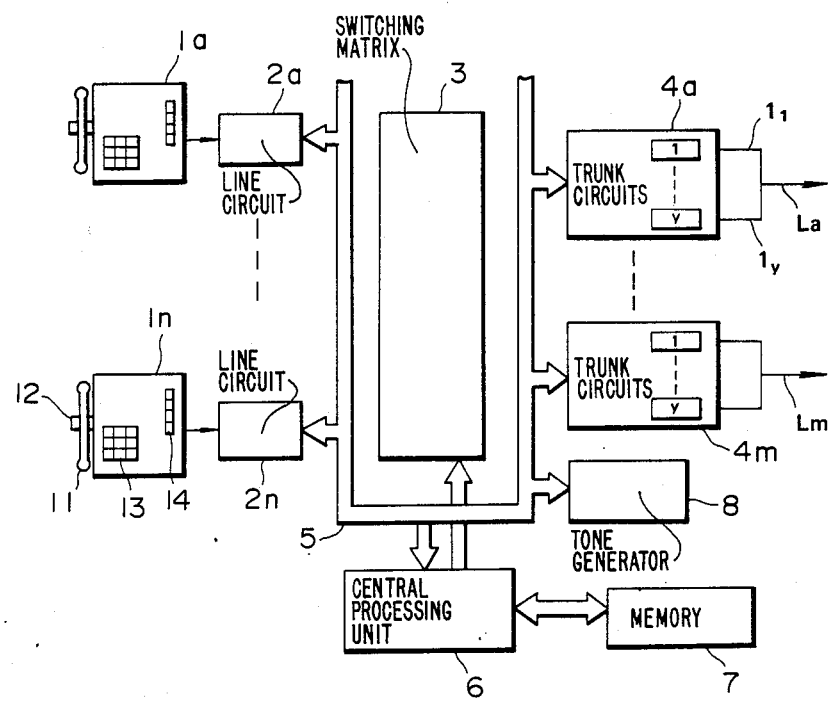
FIG. 4 is a block diagram showing another embodiment of this invention.

FIG. 4 shows another embodiment of this invention which is different from that shown in FIG. 1 in that a tone sending circuit (TON) 8 is added. Elements corresponding to those shown in FIG. 1 are designated by the same reference characters.

The tone sending circuit 8 is constituted by an oscillator generating a single specific frequency; and connected to the switching matrix 3 for sending an alarm tone to the trunk circuit groups $4a-4m$ or to the key telephone sets $1a-1m$. The tone sending circuit 8, the talking network 3, and the trunk circuit groups $4a-4m$ are connected to the central processing unit 6 through the control data bus line 5.

In this modification, the memory circuit 7 is provided with memory blocks $MB_{11}$, $MB_{12}$ and $MB_{13}$ as shown in Figs. 5a, 5b and 5c for the purpose of economic use of control information for establishing a talking path and for economic use of calling rates. The memory block $MB_{11}$ is divided into an artitrary number ($TR_1-TR_9=9$) in accordance with the mode of the office line sending out a dial tone dialed in a calling terminal and the classification of the time bands at the time of calling. In respective memory blocks are stored trunk line group members $TG_1-TG_j$ ($j \leq m$) (hereinafter termed TRK numbers) to be selected for calling according to the order of priority of selecting the calling (hereinafter, respective classes are termed route tables).

When the TRK number is not registered, one route table stores a specific value (FF).

The memory block $MG_{12}$ acts as a memory device which shows that a calling request from a specific terminal for the trunk circuit groups corresponding to the TRK number is rendered to waits.

Where "1" is stored in the corresponding TRK group, this means that the calling request for the TRK group is rendered to waits. When the memory device stores "0" it means that there is no waiting terminal for a given TRK groups.

The memory block $MB_{13}$ acts as a memory device that shows that each class corresponds to the route table and the telephone number of a terminal waiting for the calling request to the trunk circuit groups. One class can store any number of telephone numbers. Where there is no telephone number to be stored, a specific value (FF) is stored, Each one of the key telephone sets $1a-1n$ usually comprises a handset 11, its hook 12, a dial mechanism 13 and various service keys 14, and off-PBX calling is made by raising handset 11 off-hook and then dialling a desired office line calling request number and a toll office line dial number following thereto.

Where the key telephone set 1a is authorized to perform off-PBX calling, the processing of its calling will be described with reference to the flow chart shown in FIG. 6.

When a call is placed by the key telephone set 1a, the resulting calling information is transferred to the central processing unit 6 via line circuit 2a. When the switching matrix 3 is in a condition permitting the line connection in response to this calling information, the central processing unit 6 sends a dial tone to the key telephone set 1a to inform it the fact that dialling is possible to a private branch line number or off-PBX to a toll office number. Consequently, when the necessary number of the orders of magnitude of the information of the private branch line or the toll office number from the key telephone set 1a are inputted, the central processing unit 6 judges that whether the connection is to be made for connecting private branch lines or off-PBX to office lines. When the result of judgment shows a dial information requiring office line connection, off-PBX the central processing unit 6 again sends a dial tone to the key telephone unit 1a and then informs it the fact that the dial-in operation of an office line sending dial number, that is the dial information in the toll office following the toll office number is possible. As a consequence, at step 301 when inputted with the dial number information in the toll office via LC 2a, the central processing unit 6 stores the dialed number to determine the corresponding route table from the memory block $MG_{11}$ based on the mode of the toll office dial number and the calling time band at step 302. This processing may be executed in the same manner as the above described processing utilizing the memory blocks $MG_{11}$–$MB_5$ shown in FIGS. 2a–2c. It is assumed that the route table $TR_i$ is selected.

At step 303, the central processing unit 6 starts to scan an idle trunk circuit out of the trunk circuit groups corresponding to route number $TR_i$ of the highest order of selection priority among TRK numbers $TG_1$, $TG_2$, $TG_5$ and $TG_i$ registered in the route table $TR_i$.

More particularly, the central processing unit 6 checks whether there is an idle trunk circuit in the trunk circuits belonging to the trunk line group corresponding to the TRK number $TG_1$. When an idle trunk circuit presents in the group at step 304, a judgment is made as to whether the trunk circuit group has the last order of priority. The trunk circuit group at the last order of priority means a trunk circuit registered at the last (right most side) among the trunk circuit group registered in the route table $TR_i$. When the idle trunk circuit is not present at the last order of priority, the central processing unit 6 connects the key telephone set 1a to the idle trunk circuit for sending a toll office dial member corresponding to the route table $TR_i$ (not shown) to the idle trunk circuit at step 310, after changing the toll office dial number to a corresponding mode, thus terminating the processings of the selection of the trunk circuit and the office line calling.

Where there is no idle trunk circuit in the trunk circuit group corresponding to TRK number $TG_1$, the central processing unit 6 selects an idle trunk circuit out of a trunk circuit group corresponding to the TRK number having the next priority. When an idle trunk circuit presents, the same procedure as that for the trunk circuit group corresponding to the TRK number $TG_1$, and where the selected trunk circuit does not belong to the trunk circuit group of the last order of priority, the connection and calling processings of the selected trunk are executed, thus completing the selection processing.

In this manner, the central processing unit 6 continuously scans the trunk circuit groups starting from the highest order to the last order of priorities corresponding to the TRK number registered in a corresponding route table until an idle trunk circuit is found.

Even when the search is made for the trunk circuit group having the last order of priority and no idle trunk circuit was found in the trunk circuit group, at step 316, the central processing unit 6 sends a busy tone to the key telephone set 1a, thereby terminating the selection processing of the trunk circuit.

Where an idle trunk circuit exists in the trunk circuit group having the last order of priority, at step 305, the central processing unit 6 causes the tone sending circuit 8 to send an alarm tone to the key telephone set 1a acting as a calling terminal via the talking network 3. the user of the key telephone set 1a knows that the selected trunk circuit belongs to the trunk circuit group of the last order of priority when he hears the alarm tone. Thus the user is alarmed that he uses as line of the highest rate in a given time band.

While sending out the alarm tone to the key telephone set 1a, the central processing unit 6 supervises the performance of the key telephone set 1a as follows.

More particularly, since the user of the key telephone set 1a does not wish to call through the trunk circuit of the last order of priority but instead desires to call through less expensive trunk circuit, at step 306, the central processing circuit 6 checks whether the calling request was caused to wait until an idle trunk circuit is found in a trunk circuit group other than the trunk circuit group having the last order of priority in the same route table. Such wait request can be made by using one of the service keys 14 at the key telephone set 1a as a wait request key and when this key is depressed the key telephone set 1a sends out a specific signal that can be identified by the central processing unit 6 through the data bus line 5. When the central processing unit 6 recognizes that the wait request key of the key telephone set 1a has been depressed, at step 313, the central processing unit 6 stops the alarm tone, thus executing the waiting processing of the key telephone unit 1a.

In the wait processing, a "1" (acting as an information showing respective trunk circuit groups have a wait request pending) is stored in areas corresponding to the trunk circuit groups of the memory block $MB_{12}$, except the trunk circuit group corresponding to TRK number $TG_i$ having the last order of priority. Furthermore, at step 314, in the memory block $MB_{13}$ is stored or registered a terminal telephone number to indicate a wait request pending in a corresponding area of the route table. In this example, "1" is stored in areas for the trunk circuit groups corresponding to TRK numbers $TG_1$, $TG_2$ and $TG_5$ of the memory block $MB_{12}$, while the telephone number DNGK 1a of the key telephone set 1a is stored in an area of the memory block $MB_3$ corresponding to route number $TR_i$.

Figure 7:
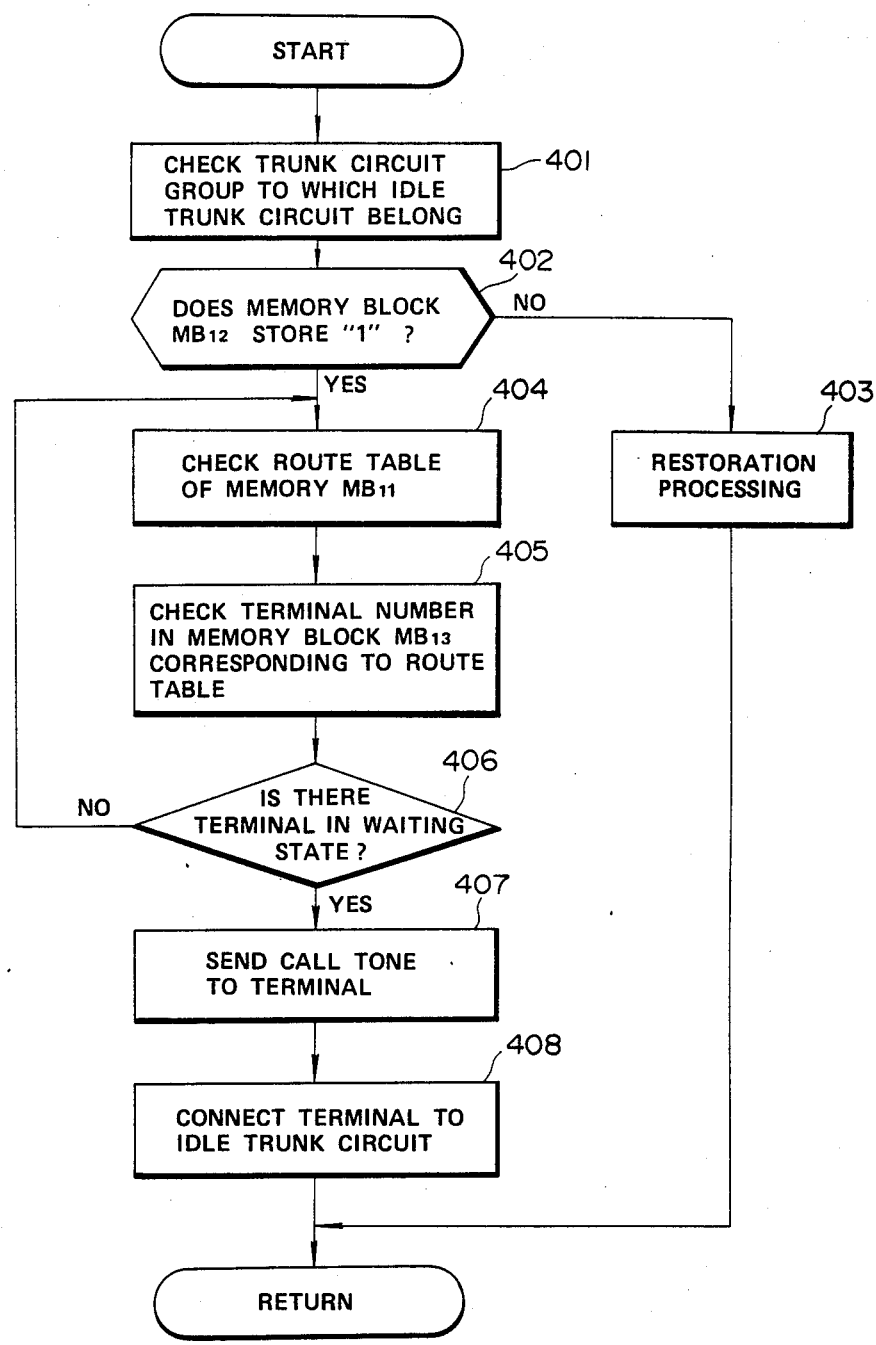
FIG. 7 is a flow chart showing the processing of the waiting state.

At step 315, a processing for waiting is executed. FIG. 7 shows a flow chart of this processing. As shown, at step 401, when a trunk circuit becomes idle the central processing unit 6 determines to which trunk circuit group the recently idled trunk circuit belongs. At step 402, a check is made as to whether "1" is stored in a memory area of the memory block MB$_{12}$, corresponding to that trunk circuit group. When the result of check is No, that no wait request is pending for this TRK group, the central processing unit 6 restores the trunk circuit. Thus returning to the normal processing at step 403. However, when a wait request is pending for this trunk group at step 404, the central processing unit 6 searches memory block MB$_{11}$ to determine in which route table TR$_1$-TR the trunk group is stored. Then at step 405, based on the first determined route table, a check is made to determine whether the terminal telephone number for which the wait request is pending is stored in an area of memory block MB$_{13}$ corresponding to this route table number. At step 406, when it is found that there is no terminal in the calling request waiting state in an area of the memory block MB$_{13}$ corresponding to the first route table searched out from the memory block MB$_{11}$, the central processing unit 6 searches again for another route table of the memory block MB$_{11}$ in which the TRK group is registered and repeats this processing until a terminal in the calling request waiting state is found in the memory block MB$_{13}$. When a terminal in the calling request waiting state is found in the memory block MB$_{13}$, at step 407, the central processing unit 6 sends a call tone to that terminal ( in this example, key telephone unit 1a) is inform to the terminal that the office line calling is possible. When the terminal responds to the call signal, at step 408, the central processing unit 6 interconnects the terminal and the trunk circuit that became idle to permit sending out to the trunk line a toll office dial number corresponding to the route table, thus completing the wait processing.

Figure 8:
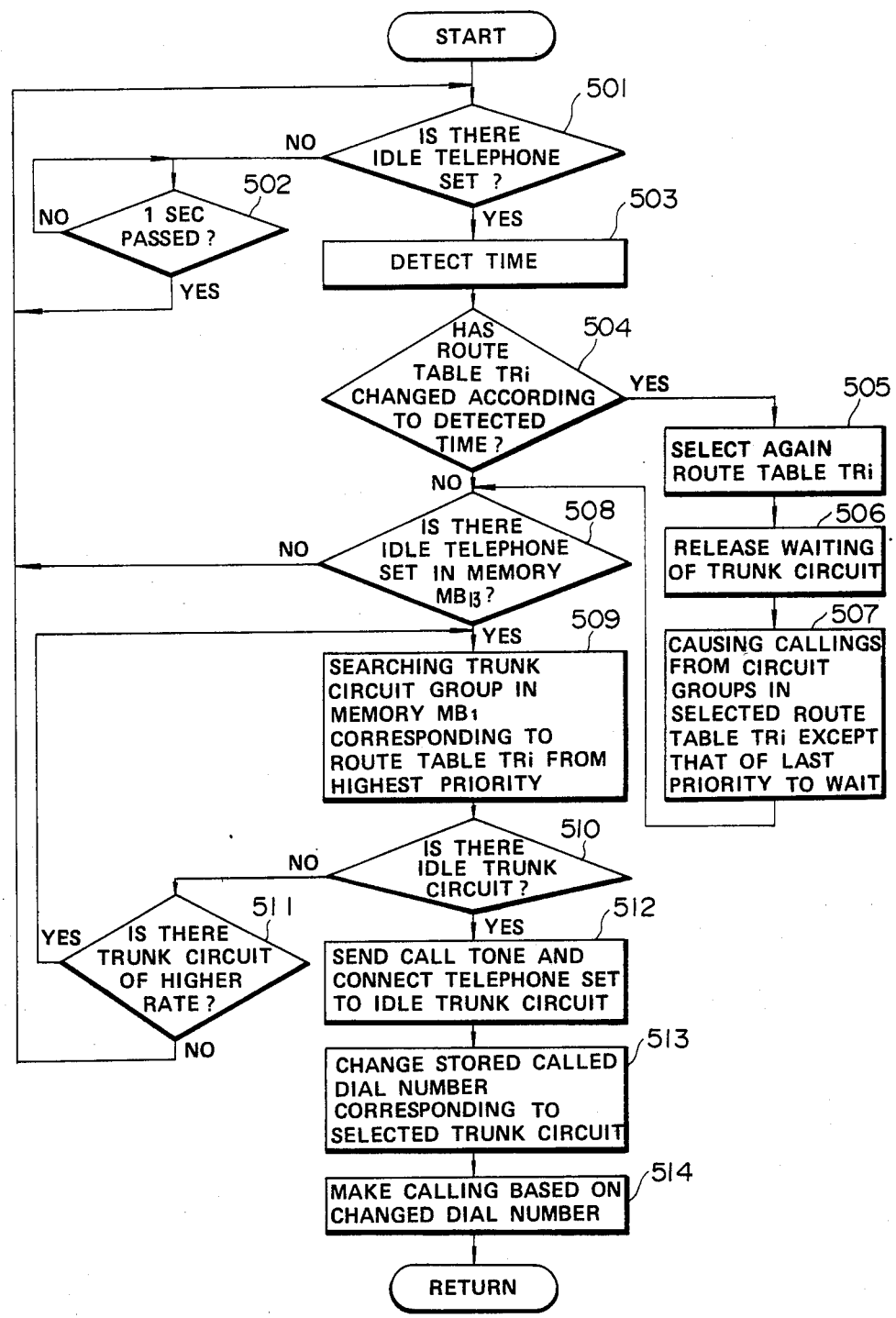
FIG. 8 is a flow chart showing another example of the processing of the waiting state.

FIG. 8 shows a modified detailed flow chart of the wait processing (step 315 or FIG. 6). At first a check is made as to whether there is an idle key telephone set at step 501, and then the result is NO, the program is branched to step 502 for judging as to whether one second has elapsed or not. When one second has elapsed the program is returned to step 501. Thus, at each one second a check is made as to whether there is an idle key telephone set or not. At step 501, when it is judged that there is an idle key telephone set, the program is advanced to stop 503 at which the time is checked. Then at step 504, a judgment is made as to whether the route table TR$_i$ has been changed according to the detected time. When it is judged that the route table has not been changed, the program is advanced to step 508.

When it is judged that the route table TR$_i$ has changed, at step 505, the route table TR$_i$ is selected again and at step 506, the waiting state of a trunk circuit which was forced to wait is released. At step 507, all calling from circuit groups except a trunk circuit group of the last order of priority in the selected calling route table TR$_i$ are caused to wait a calling request. Therafter, the program is advanced to step 509.

At step 508, a judgment is made as to whether there is an idle key telephone set corresponding to the telehone number registered in the memory block MB$_{13}$ or not. When the result of judgment is NO, the program is returned to step 501. When the result of judgment at step 508 is YES, the program is transferred to step 509 for sequentially searching the trunk circuit group stored in the memory block MB$_{11}$ corresponding to the route table TR$_i$ in which an idle key telephone set has been registered starting from the trunk circuit group having the highest order of priority. At the same time, at step 510, a judgment is made as to whether there is an idle trunk circuit or not. When the result of judgment is NO, at step 511, a judgment is made as to whether there is a next trunk circuit or not, that is whether a trunk circuit group of higher rate (i.e., lower priority) of the route table is remaining or not. When it is judged that there is a remaining higher rate trunk group, the program is returned to step 509, whereas when it is judged that there is no remaining table, the program is returned to step 501.

At step 510, when it is judged that an idle trunk circuit is available in the tested trunk circuit group, at step 512 a call tone is sent to a key telephone set in the calling request waiting state and to connect the key telephone set to the idle trunk circuit. Then, at step 513, the registered called dial number is changed to a state corresponding to the selected trunk circuit, and at step 514, the call is made based on the changed dial number.

When the key telephone set 1a receives the alarm tone, and desires neither to place the call from the trunk circuit having the last order of priority nor register a wait request, the user of the key telephone set 1a hooks on its handset 11 (hangs up) to prevent the office line call from being placed. At step 307 (FIG. 6), when the central control unit 6 detects this on hook state, it interrupts the alarm tone at step 311 for restoring the key telephone set at step 312, thus terminating the trunk circuit selection processing.

When the user of the key telephone set 1a desires to call through the trunk circuit of the last order of priority, the user waits for the termination of the alarm tone. During sending out of the alarm tone, when the central processing unit 6 does not receive a waiting request or a restore request from the key telephone unit 1a, at step 308, the central processing unit 6 checks whether the alarm tone sending time is over or not. When the time the time is not over, the central processing unit 6 continues to supervise the waiting request or restore request of the key telephone unit 1a. When the alarm tone sending time is over, at step 309, the central processing unit 6 stops the alarm tone, and at step 310, it connects the idle trunk circuit of the last order of priority and the key telephone set 1a for sending out a toll office dial number corresponding to the route table to the idle trunk circuit, thus terminating the selection processing of the trunk circuit.

As above described, this embodiment is constructed such that the user is informed of the fact that a trunk circuit of the highest rate is selected by giving an alarm tone when a trunk circuit of the last order of priority is selected so as to urge the user to determine whether he desires to use such an expensive trunk circuit or not, or to make the user use a less expensive trunk circuit. Accordingly it is possible to prevent the user from using a high rate trunk circuit.

The sending out of the alarm tone is not limited to a time at which a trunk circuit of the last order or priority is selected but the alarm tone may be sent out when a trunk circuit of any order of priority is selected. The waiting processes can be made in the same manner. A plurality of alarm tones having different tone colors can be assigned to respective telephone sets according to the order of priority so as to inform the telephone user of the various trunk circuits and call rates that his call will use. Consequently, different calling rates can be economically utilized.

What is claimed is:

1. An electronic private branch exchange apparatus comprising:

a plurality of office line trunk circuits for connecting a calling terminal in an exchange network to one of a plurality of office lines;

setting means for setting an order of connection priority for said plurality of office line trunk circuits;

designating means for designating a range of said office line trunk circuits selected according to said order of connection priority in accordance with a time band within which a call is made;

selecting means for selecting one among said plurality of office line trunk circuits in accordance with said order of connection priority in a range designated by said designating means;

alarm means for issuing an alarm when an office line trunk circuit of a last order of priority is selected by said selecting means; and waiting means for registering a calling request from said calling terminal to an office line trunk circuit, other than the office line trunk circuit of said last order of priority, as a pending wait request when a predetermined operation is made while said alarm is being issued from said alarm means.

2. The apparatus according to claim 1 wherein said plurality of office line trunk circuits are divided into a plurality of groups, said setting means sets said order of connection priority corresponding for each group, said selecting means selects one of said groups in accordance with said order of connection priority, said alarm means issues an alarm when an office line trunk circuit group of a last order of priority is selected by said selecting means, and said waiting means registers a calling request from said calling terminal to an office line trunk circuit, other than a group of said last order of priority, as a pending wait request when a predetermined operation is performed while said alarm is being issued from said alarm means.

3. The apparatus according to claim 1 wherein said waiting means comprises memory means for storing a terminal number of said calling terminal and means for connecting one idle office line trunk circuit other than said office line trunk circuit of said last order of priority to said calling terminal according to the order of connection priority in a time band when an office line trunk circuit other than said last order of priority becomes idle based on a content of said memory means.

4. The apparatus according to claim 2 wherein said waiting means comprises memory means for storing a terminal number of said calling treminal, and means for connecting, based on a content of said memory means, an idle office line trunk circuit of said office line trunk circuit groups, other than said last order of priority, according to the order of connection priority in a time band in which one of said office line trunk circuits, other than an office line trunk circuit in a group of last priority, becomes idle.

5. The apparatus according to claim 1 wherein said waiting means comprises first memory means for registering a pending wait request for each trunk circuit; second memory means for storing a terminal number of said calling terminal; and means for connecting an idle office line trunk circuit, other than said office line trunk circuit of said last order of priority, to said calling terminal according to an order of connection priority in a time band in which the office line trunk circuit, other than a circuit of last order of priority, becomes idle, based on contents of said first and second memory means.

6. An electronic private branch exchange apparatus comprising:

a plurality of office line trunk circuits for connecting a calling terminal in an exchange network to one of a plurality of office lines, said office lines being arranged in a plurality of office line trunk circuit groups having a plurality of calling cost rates;

setting means for setting an order of connection priority for said plurality of office line trunk circuit groups, said setting means setting the order of connection priority to respective office line trunk circuits in accordance with a number sequence produced by a dialing of the calling terminal;

designating means for designating a range of the office line trunk circuits selected according to said order of connection priority in accordance with a calling time band within which a call is made; and selecting means for selecting one among said plurality of office line trunk circuit groups according to said order of connection priority in a range designated by said designating means.

7. The apparatus according to claim 6 wherein said designating means designates, corresponding to each calling terminal, a range of the office line trunk circuits to be selected according to said order of connection priority.

8. The apparatus according to claim 6 wherein said designating means designates, corresponding to each calling terminal a range of said office line trunk circuit groups to be selected according to said order of connection priority.

9. The apparatus according to claim 6 wherein said setting means sets the order of connection priority for respective office line trunk circuit groups according to the cost rates of the office line trunk circuit groups.

10. An electronic private branch exchange apparatus comprising:

a plurality of office line trunk circuits for connecting a calling terminal in an exchange network to one of a plurality of office lines, said office lines being arranged in a plurality of office line trunk circuit groups having a plurality of calling cost rates;

setting means for setting an order of connection priority for said plurality of office line trunk circuit groups, said setting means setting the order of connection priority for respective office line trunk circuit groups in accordance with a number sequence produced by a dialing of the calling terminal;

designating means for designating a range of the office line trunk circuits selected according to said order of connection priority in accordance with a calling time band within which a call is made; and selecting means for selecting one among said plurality of office line trunk circuit groups according to said order of connection priority in a range designated by said designating means.

11. The apparatus according to claim 10 wherein said designating means designates, corresponding to each calling terminal, a range of the office line trunk circuits to be selected according to said order of connection priority.

12. The apparatus according to claim 10 wherein said designating means designates, corresponding to each calling terminal, a range of said office line trunk circuit groups to be selected according to said order of connection priority.

13. The apparatus according to claim 10 wherein said setting means sets the order of connection priority for respective office line trunk circuit groups according to the cost rates of the office line trunk circuit groups.

14. An electronic private branch exchange apparatus comprising:
a plurality of office line trunk circuits for connecting a calling terminal in an exchange network to one of a plurality of office lines, said office lines being arranged in a plurality of office line trunk circuit groups having a plurality of calling cost rates;
setting means for setting an order of connection priority for said plurality of office line trunk circuit groups, said setting means comprising memory means for storing the order of connection priority to respective available office line trunk circuit groups in accordance with a number sequence produced by a dialing of the calling terminal;
designating means for designating a range of the office line trunk circuits selected according to said order of connection priority in accordance with a calling time band within which a call is made; and
selecting means for selecting one among said plurality of office line trunk circuit groups according to said order of connection priority in a range designated by said designating means.

15. The apparatus according to claim 14 wherein said designating means designates, corresponding to each calling terminal, a range of the office line trunk circuits to be selected according to said order of connection priority.

16. The apparatus according to claim 14 wherein said designating means designates, corresponding to each calling terminal, a range of said office line trunk circuit groups to be selected according to said order of connection priority.

17. The apparatus according to claim 14 wherein said setting means sets the order to connection priority for respective office line trunk circuit groups according to the cost rates of the office line trunk circuit groups.

18. An electronic private branch exchange apparatus comprising:
a plurality of office line trunk circuits for connecting a calling terminal in an exchange network to one of a plurality of office lines;
setting means for setting an order of connection priority for said plurality of office line trunk circuits;
designating means for designating a range of the office line trunk circuits selected according to said order of connection priority in accordance with a calling time band within which a call is made, said designating means comprising first memory means for storing a first selection range data designated corresponding to each calling terminal, and second memory means for storing a section selection range data designated corresponding to a combination of said first selection range data and a time band data whereby said designating means designates a range of the office line trunk circuits to be selected based on the contents of said first and second memory; and
selecting means for selecting one among said plurality of office line trunk circuits according to said order of connection priority in a range designated by said designating means.

19. The apparatus according to claim 18 wherein said designating means designates, corresponding to each calling terminal, a range of the office line trunk circuits to be selected according to said order of connection priority.

20. The apparatus according to claim 18 wherein said office lines are arranged in a plurality of office line trunk circuit groups and, wherein said designating means designates, corresponding to each calling terminal, a range of said office line trunk circuit groups to be selected according to said order of connection priority.

21. The apparatus according to claim 20 wherein said setting means sets the order of connection priority for respective office line trunk circuit groups according to the cost rates of the office line trunk circuit groups.

22. Electronic private branch exchange apparatus comprising:
a plurality of office line trunk circuits for connecting a calling terminal in an exchange network to one of a plurality of office lines, said plurality of office line trunk circuits being divided into a plurality of groups;
setting means for setting an order of connection priority for each group in accordance with a number sequence produced by a dialing of the calling terminal;
designating means for designating a range of the office line trunk circuits selected according to said order of connection priority in accordance with a time band within which a call is made;
selecting means for selecting one among said plurality of said groups according to said order of connection priority in a range designated by said designating means; and
alarm means for issuing an alarm when a group of a last order of priority is selected by said selecting means.

23. The apparatus according to claim 22 wherein said designating means designates, corresponding to each calling terminal, a range of office line trunk circuits to be selected in accordance with said order of connection priority.

24. The apparatus according to claim 22 wherein said designating means designates, corresponding to each calling terminal, a range of said office line trunk circuit groups selected in accordance with said order of connection priority.

25. The apparatus according to claim 22 wherein said setting means sets said order of connection priority for respective office line trunk circuit groups according to the order of cost rates of said office line trunk circuit groups.

* * * * *